United States Patent
Schmalstieg et al.

[11] Patent Number: 6,060,574
[45] Date of Patent: May 9, 2000

[54] REACTIVE COMPOSITIONS CONTAINING BLOCKED POLYISOCYANATES AND AMINE-FUNCTIONAL RESINS

[75] Inventors: Lutz Schmalstieg, Köln; Volker Schwindt, Leverkusen; Tillmann Hassel, Pulheim; Gerhard Ruttmann, Burscheid; Jürgen Schwindt, Leverkusen, all of Germany

[73] Assignee: Bayer Aktiengesellschaft, Leverkusen, Germany

[21] Appl. No.: 09/287,875

[22] Filed: Apr. 7, 1999

[30] Foreign Application Priority Data

Apr. 15, 1998 [DE] Germany .......................... 198 16 570

[51] Int. Cl.$^7$ .................................................. C08G 18/80
[52] U.S. Cl. ................................ 528/45; 528/60; 528/61; 528/73
[58] Field of Search ................................ 528/45, 73, 60, 528/61

[56] References Cited

U.S. PATENT DOCUMENTS

| | | | |
|---|---|---|---|
| 3,770,703 | 11/1973 | Gruber et al. | 260/77.5 TB |
| 3,912,566 | 10/1975 | Andrews et al. | 156/330 |
| 4,471,106 | 9/1984 | Luecke et al. | 528/205 |
| 4,482,661 | 11/1984 | Liu | 523/439 |
| 5,061,775 | 10/1991 | Schmalstieg et al. | 528/45 |
| 5,262,481 | 11/1993 | Jammet | 525/125 |

FOREIGN PATENT DOCUMENTS

| | | |
|---|---|---|
| 1644813 | 1/1971 | Germany . |
| 1399257 | 7/1975 | United Kingdom . |

*Primary Examiner*—Rachel Gorr
*Attorney, Agent, or Firm*—Joseph C. Gil; Thomas W. Roy

[57] ABSTRACT

The present invention relates to a reactive composition containing

A) an organic polyisocyanate having a number average molecular weight (excluding the blocking agent) of 168 to 25,000, wherein the isocyanate groups are reversibly blocked with a hydrocarbon resin containing phenolic OH groups, B) at least one organic polyamine having at least two primary amino groups and C) optionally a compound containing oxirane groups.

The present invention also relates to the use of these reactive systems for the preparation of coatings, adhesives, sealants, embedding compounds or molded articles.

17 Claims, No Drawings

REACTIVE COMPOSITIONS CONTAINING BLOCKED POLYISOCYANATES AND AMINE-FUNCTIONAL RESINS

BACKGROUND OF THE INVENTION

1. Field of the Invention

The present invention relates to reactive compositions containing a blocked polyisocyanate component and an isocyanate-reactive component having primary amino groups and to their use for the production of coatings, adhesives, sealants, embedding compounds and molded articles.

2. Description of the Prior Art

A large number of reactive systems based on blocked polyisocyanates and polyamines are known. DE-A 1,644,813 describes the production of coating compositions based on ketoxime-blocked polyisocyanates and organic polyamines. These systems cure extremely slowly at room temperature and generally require temperatures above 120° C. to cure, which is disadvantageous for two reasons. One, the thermal treatment is often not possible and, two, the systems tend to form bubbles during thermal treatment such that they can only be applied in thin layers.

DE-A 2,131,299 describes mixtures which can be hardened under the effect of heat and contain a polyisocyanate component having caprolactam-blocked isocyanate groups and cycloaliphatic polyamines. These compositions have good storage stability and are suitable for producing thick coatings with good mechanical properties. However, a disadvantage of these systems is the high temperature of about 160° C. which is required for curing.

DE-A 3,922,767 describes heat-curable mixtures containing polyisocyanates blocked with secondary monoamines and organic polyamines. These compositions exhibit a good combination of pot life and low curing temperatures. However, elimination of the blocking agent from these systems is problematic due to the production of unpleasant odiferous compounds. In addition, the compositions of DE-A 3,922,767 cannot be used to produce coatings which harden at room temperature since the rate of hardening is too slow and, according to previous findings, cannot be catalytically accelerated.

DE-A 2,152,606 describes reactive systems based on alkylphenol-blocked polyisocyanates and polyamines that can optionally be cured in combination with epoxide resins. These reactive systems are also associated with some application-oriented disadvantages. First, the reactivity is so high that the compositions can only be applied and cured at room temperature due to the relatively short pot lives. Second, the blocking agent which is released has a comparatively low molecular weight, so that it evaporates out of the coating over time, which can lead to adhesion problems and may have a deleterious effect on the mechanical properties.

An object of the present invention is to provide reactive systems based on blocked polyisocyanates and polyamines which do not have the disadvantages of the prior art compositions.

This object may be achieved with the compositions according to the present invention which are described hereinafter.

SUMMARY OF THE INVENTION

The present invention relates to a reactive composition containing

A) an organic polyisocyanate having a number average molecular weight (excluding the blocking agent) of 168 to 25,000, wherein the isocyanate groups are reversibly blocked with a hydrocarbon resin containing phenolic OH groups, B) at least one organic polyamine having at least two primary amino groups and C) optionally a compound containing oxirane groups.

The present invention also relates to the use of these reactive systems for the preparation of coatings, adhesives, sealants, embedding compounds or molded articles.

DETAILED DESCRIPTION OF THE INVENTION

The present invention is based on the surprising observation that the blocked polyisocyanates according to the invention, when compared with prior art alkylphenol-blocked polyisocyanates, have a greatly reduced reactivity towards polyamines.

Polyisocyanates (A) with reversibly blocked isocyanate groups are prepared by reacting organic polyisocyanates at temperatures of 40° C. to 150° C., preferably 50° C. to 100°C., with hydrocarbon resins containing phenolic OH groups. The amount of hydrocarbon resin to be used during the blocking reaction should be at least equivalent to the amount of NCO groups to be blocked. Frequently, a small excess of blocking agent may be expedient in order to ensure complete reaction of all the isocyanate groups. The excess is generally not greater than 20 mole %, preferably not greater than 15 mole % and more preferably not greater than 10 mole %, based on the moles of isocyanate groups to be blocked.

The blocking reaction is preferably performed in the presence of catalysts, which are known from polyurethane chemistry, and include organometallic compounds such as tin(II) octoate, dibutyltin(II) diacetate and dibutyltin(II) dilaurate; and tertiary amines such as triethylamine and diazabicyclooctane. The blocking reaction may optionally be performed in the presence of an inert solvent, e.g., the lacquer solvents set forth below. Suitable polyisocyanates for preparing blocked polyisocyanates A) include organic polyisocyanates or polyisocyanate mixtures having a number average molecular weight, which is determined from the isocyanate content and functionality, of 168 to 25,000, preferably 1000 to 12,000. These polyisocyanates are known from polyurethane chemistry and include hexamethylene diisocyanate, isophorone diisocyanate, dicyclohexylmethane diisocyanate, the isomeric diphenylmethane diisocyanates and their higher homologs produced by the phosgenation of aniline/formaldehyde condensation products, 2,4- and 2,6-toluylene diisocyanate and their technical grade mixtures. Also suitable are the known lacquer polyisocyanates prepared from the preceding monomeric polyisocyanates and containing biuret, isocyanurate, uretdione and/or urethane groups.

The starting polyisocyanates are preferably NCO prepolymers obtained by the reaction of low or high molecular weight polyhydroxyl compounds with excess amounts of the previously mentioned diisocyanates or polyisocyanates or with larger excesses of these diisocyanates and polyisocyanates followed by removal of the excess polyisocyanate, e.g., by thin layer distillation. The prepolymers are generally prepared at 40 to 140° C., optionally in the presence of a suitable catalyst, such as these previously set forth.

Suitable polyhydroxyl compounds that are suitable for preparing the NCO prepolymers include low molecular weight polyhydroxyl compounds having a molecular weight of 62 to 299, such as ethylene glycol, propylene-1,3 glycol, butane-1,4-diol, hexane-1,6-diol, neopentyl glycol, 2-ethylhexane-1,3-diol, glycerol, trimethylolpropane and pentaerythritol. Also suitable are low molecular weight polyesters polyols and formed from these polyols and the dicarboxylic acids set forth below; low molecular polyether polyols prepared by the ethoxylation or propoxylation of the preceding polyols; and mixture of any of the preceding modified or non-modified polyols.

Preferably, high molecular weight polyhydroxyl compounds, which are known from polyurethane chemistry and have a number average molecular weight of 300 to 20,000, preferably 1000 to 8000, are used to prepare the prepolymers. Suitable high molecular weight polyhydroxyl compounds for preparing NCO prepolymers include polyester polyols, polylactone polyols, polyether polyols, polytetramethylene glycol polyethers, polycarbonate polyols, polythioether polyols and polyacetal polyols.

Suitable polyester polyols include those prepared from the low molecular weight, monomeric polyols previously set forth and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and anhydrides. Polylactones containing hydroxyl groups, in particular poly-ε-caprolactones, are also suitable for preparing the NCO prepolymers or semiprepolymers.

Suitable polyether polyols include those prepared in known manner by the alkoxylation of suitable starter molecules. Suitable starter molecules include the low molecular weight, monomeric polyols previously set forth, water, organic polyamines having at least two N-H bonds, and mixtures of these starter molecules. Suitable alkylene oxides include ethylene oxide and/or propylene oxide, which may be used in any sequence or as a mixture during the alkoxylation reaction.

Suitable polytetramethylene glycol polyethers include those obtained in known manner by the cationic polymerization of tetrahydrofuran.

Suitable polycarbonate polyols include those prepared by reacting the low molecular weight, monomeric polyols previously set forth with diaryl carbonates, such as diphenyl carbonate or phosgene.

Suitable polythioether polyols include those obtained by the polycondensation of thiodiglycol with itself or with the low molecular weight, monomeric diols and/or polyols previously set forth.

Suitable polyacetals include the polycondensation products of formaldehyde and the low molecular weight, monomeric diols and/or polyols previously set forth, which may be obtained by using acid catalysts, such as phosphoric acid or p-toluenesulfonic acid.

Mixtures of the preceding polyhydroxyl compounds may also be used to prepare the prepolymers.

The aromatic polyisocyanates previously set forth, especially those having a molecular weight of 174 to 300, are particularly preferred for preparing the NCO prepolymers due to the higher reactivity of the blocked polyisocyanates A) prepared therefrom.

Hydrocarbon resins containing phenolic OH groups, which are suitable for preparing blocked polyisocyanates A), include those and described in Ullmanns Encyklopädie der technischen Chemie, 4th edition, vol. 12, pages 539 to 545 (Verlag Chemie, Weinheim 1976); Kirk-Othmer, Encyclopedia of Chemical Technology, 3rd edition, vol. 12, pages 852 to 869 (John Wiley & Sons, New York 1980); and the Encyclopedia of Polymer Science and Engineering, vol. 7, pages 758 to 782 (John Wiley & Sons, New York 1987). Examples of suitable hydrocarbon resins containing phenolic OH groups include coumarone-indene resins, petroleum resins and terpene resins, such as α-pinene, β-pinene, dipentene, D-limonene and turpentine.

These types of hydrocarbon resins containing phenolic OH groups are generally prepared by the copolymerization of unsaturated hydrocarbons phenol or substituted phenols in the presence of strong acids or catalysts of the Friedel-Crafts type. Suitable unsaturated hydrocarbons for preparing the OH-functional hydrocarbon resins are those produced during the cracking of naphtha or gas oil, such as butene, butadiene, pentene, piperylene, isoprene, cyclopentadiene, styrene, α-methylstyrene, vinyltoluene, dicyclopentadiene, methyldicyclopenta-diene, indene and methylindene.

Preferred hydrocarbon resins are those having a hydroxyl group content (calculated as OH, MW 17) of 1.0 to 6.0 wt. %. Hydrocarbon resins that are liquid at room temperature and have a hydroxyl group content of 1.5 to 4.0 wt. % are especially preferred for preparing component A).

To prepare the compositions according to the invention, the blocked polyisocyanates A) may be present in known lacquer solvents, such as ethyl acetate, butyl acetate, methoxypropyl acetate, methyl ethyl ketone, methyl isobutyl ketone, toluene, xylene, aromatic or (cyclo)aliphatic hydrocarbon mixtures and mixture thereof.

Component B) in the compositions according to the invention are polyamines containing at least two primary amino groups per molecule, preferably those having a number average molecular weight of 60 to 500. Examples include ethylene diamine, 1,2- and 1,3-diaminopropane, 1,4-diaminobutane, 1,6-diaminohexane, 2,2,4- and/or 2,4,4-trimethyl hexamethylene diamine, the isomeric xylylene diamines and polyamines containing secondary amino groups as well as two primary amino groups such as diethylenetriamine or triethylenetetramine.

Especially preferred polyamines, in particular diamines, are those containing one or more cycloaliphatic rings. Examples include 1,4-diaminocyclohexane, 4,4'-diaminodicyclohexylmethane, 1,3-diaminocyclopentane, 4,4'-diaminodicyclohexylsulfone, 4,4'-diaminodicyclohexyl-1,3-propane, 4,4'-diaminodicyclohexyl-2,2-propane, 3,3'-dimethyl-4,4'-diamino-dicyclohexylmethane, 3-aminomethyl-3,3,5-trimethylcyclohexylamine (isophorone diamine) and technical grade bis-amino-methyltricyclodecane, such as the product sold under the tradename "TCD-Diamin" by Hoechst AG.

Adducts prepared by reacting an excess of the preceding polyamines with epoxide resins set forth below may also be used as component B). Further suitable as component B) are polyamide resins. These polyamide resins, which also encomparspoliaminoamides and polyaminoimidazolines, are commercially available under the trade mark Versamid® by the Henkel Company. Also suitable are polyether polyamines, which are prepared by reacting polyether polyols with ammonia and sold, for example, by the Huntsman under the Jeffamine tradename. Also suitable are mixtures of the polyamines previously mentioned as suitable for use as component B).

Components A) and B) are present in the reactive systems according to the invention in amounts such that the equivalent ratio of blocked isocyanate groups in component A) to primary and secondary amino groups in component B) is 0.8:1 to 1.2:1, preferably 0.9:1 to 1.1:1.

When compared to the prior art, the reactive compositions according to the invention have an exceptional ratio of storage stability to firing temperature which dependent upon the catalyst system used. For example, mixtures that do not contain a catalyst can be prepared which have a pot life of several days at room temperature, but cure within 20 minutes when the temperature is increased to 120° C. Mixtures containing a catalyst can be produced that have a pot life of 3 to 4 hours at room temperature and are thoroughly cured after 24 hours.

Suitable catalysts are preferably compounds containing basic nitrogen atoms, such as tertiary amines or Mannich bases and preferably amidines. Particularly preferred catalysts include optionally substituted, alkyl aralkyl or aryl groups which carry amidine bases. The CN double bond in the amidine structure may be either part of an open-chain molecule or a constituent of a cyclic or bicyclic system, or may also be located outside the ring in a compound with a ring system. Mixtures of these amidines are also suitable.

Suitable amidine catalysts in which the CN double bond is part of an open-chain molecule include N,N-dimethyl-N'-phenyl-formamidine and N,N,N'-trimethyl-formamidine, which may be prepared as described, e.g., in Chem Ber. 98, 1078 (1965). Examples of suitable amidines in which the CN double bond is a constituent of a cyclic system include 2-methyltetra-hydropyrimidines which are substituted in the 1-position. They can be obtained in accordance as described in DE-A 2,439,550 by reacting N-monosubstituted 1,3-propane diamines with acetoacetic acid derivatives. Also suitable are monocyclic amidine bases, which may be obtained in accordance with DE-A 1,078,568 by reacting the carbamoyl chlorides of secondary amines with lactams. Suitable catalysts in which the CN double bond is located outside a ring system include imines of N-alkyl-substituted lactams, such as 2 methylimino-1-methyl-pyrrolidone, which may be prepared as described in Chem. Ber. 101, 3002 (1968).

Bicyclic amidines, e.g., those described in EP-A 662,476, such as 1,5-diaza-bicyclo[4.3.0]non-5-ene (DBN), can also be used according to the invention.

The compositions according to the invention may optionally contain compounds having oxirane groups as component C) as a third component. Examples of these compounds are epoxide resins containing an average of more than one epoxide group per molecule. Examples of suitable epoxide resins include the glycidyl ethers of polyhydric alcohols such as butanediol, hexanediol, glycerol, hydrogenated diphenylolpropane; polyhydric phenols such as resorcinol, diphenylolpropane, diphenylolmethane (bisphenol F); and phenol/aldehyde condensates. Glycidyl esters of polybasic carboxylic acids, such as hexaphydrophthalic acid, or dimerized fatty acids may also be used.

The use of liquid epoxide resins prepared from epichlorohydrin and diphenylolpropane-2,2 (bisphenol A) and having a molecular weight of 340 to 450 are particularly preferred. If required, the viscosity of the mixtures may be lowered with monofunctional epoxide compounds to improve processability. Examples include aliphatic and aromatic glycidyl ethers such as butyl glycidyl ether and phenyl glycidyl ether; glycidyl esters such as glycidyl versatate; and epoxides such as styrene oxide or 1,2-epoxy-dodecane.

In the three-component compositions according to the invention, 0.4 to 0.9, preferably 0.5 to 0.8, primary amino groups in component B) and 0.02 to 0.5, preferably 0.03 to 0.4 blocked isocyanate groups in component A) are generally present for each epoxide group in component C). The three-component systems are generally hardened at room temperature.

The compositions according to the invention may also contain known additives such as fillers, solvents, flow control agents, pigments, reaction accelerators and viscosity regulators in addition to components A), B) and optionally C). Examples of these additives include reaction accelerators such as salicylic acid, bis-(dimethyl-aminomethyl)-phenol and tris-(dimethylaminomethyl)-phenol; fillers such as sand, crushed rocks, silica, asbestos powder, kaolin, talcum, metal powders, tar, tar pitch, asphalt, scrap cork and polyamides; plasticizers such as phthalates; and viscosity regulators such as benzyl alcohol.

The compositions according to the invention are suitable for producing coatings, adhesives, sealants, embedding compounds and molded articles in all areas of application where good adhesion, resistance to chemicals and high resistance to impact and shock, combined with high flexibility and elasticity, are required. If plastic and elastic materials are required, the reactive systems preferably do not contain component C). If highly cross-linked materials, which are resistant to chemicals are required, then the reactive systems contain only a small amount of component A) which helps to elasticize epoxide resin C).

EXAMPLES

In the examples all percentages are based on weight unless otherwise indicated.

Example 1

1330 g of a polyether polyol, which had an OH number of 42 and was prepared by the simultaneous ethoxylation and propoxylation (EO/PO ratio=2:8) of a 1:2 mixture of propylene glycol and glycerol, were reacted with 174 g of 2,4-diisocyanatotoluene for 5 hours at 80° C. until the theoretical NCO content of 2.8% was obtained.

Then 800 g of a commercially available hydrocarbon resin having a hydroxyl group content of 2.25% (Novares LA 700, commercial product from VFT AG, Duisburg) were added, and the mixture was catalyzed with 0.2 g of tin(II) octoate and stirred for 10 hours at 60° C. At this time, free isocyanate could no longer be detected in the IR spectrum. The resulting blocked NCO prepolymer had the following properties:

Blocked NCO content: 1.8%

Viscosity (23° C.): 62,000 mPa.s 233 g of the prepolymer were intimately stirred together with 11.9 g of 3,3'-dimethyl-4,4'-diaminodicyclohexylmethane. The mixture had a pot life of 48 hours. The mixture was poured out into a layer 3 mm thick and cured by heating at 120° C. for 20 minutes. A clear, elastic plastic material having the following mechanical properties was obtained:

Shore A hardness: 52

Elongation at break: 450%

Tear strength: 4.1 N/mm$^2$

Tear propagation resistance: 14 N/mm

Example 2

The NCO prepolymer was prepared as described in example 1. The blocking reaction was also as described in example with the exception that 940 g of a commercially available hydrocarbon resin having a hydroxyl group content of 1.9% (Novares LA 300, commercial product from VFT AG, Duisburg) were used as the blocking agent. The resulting blocked isocyanate prepolymer had the following properties:

Blocked NCO content: 1.7%

Viscosity (23° C.): 35,000 mPa.s 47 g of the prepolymer were intimately stirred together with 11.9 g of 3,3'-dimethyl-4,4'-diaminodicyclohexylmethane and 2.5 g of 1,8-diazabicyclo [5.4.0]undec-7-ene (DBU). The mixture was poured out into a layer 3 mm thick and hardened at room temperature within 6 hours. The clear, elastic plastic material obtained had the following mechanical properties:

Shore A hardness: 47

Elongation at break: 490%

Tear strength: 3.7 N/mm$^2$

Tear propagation resistance: 10 N/mm

Example 3

425 g of a polyester diol, which had an OH number of 66 and was prepared by the esterification of a 1:1 molar ratio of hexane-1,6-diol and neopentyl glycol with adipic acid, 500 g of a polyether diol, which had an OH number of 56 and was prepared by propoxylation of propylene glycol, and 4.5 g of trimethylolpropane were reacted at 70° C. with 174 g of an 80:20 mixture of 2,4-diisocyanatotoluene and 2,6-diisocyanato-toluene until the theoretical NCO content of 3.1% was obtained.

Then 440 g of a commercially available hydrocarbon resin with a hydroxyl group content of 3.9% (Necires EPX-LC, commercial product from Nevcin Polymers B.V., Uithoorn, Holland) were added, and the mixture was catalyzed with 0.2 g of tin(II) octoate and stirred for 10 hours at 60° C. At this time, free isocyanate could no longer be detected in the IR spectrum. The resulting blocked NCO prepolymer was dissolved in methoxypropyl acetate to form a 95% solution, which had the following properties:

Blocked NCO content: 2.35%

Viscosity (23° C.): 42,000 mPa.s 179 g of the prepolymer were intimately stirred together with 11.9 g of 3,3'-dimethyl-4,4'-diaminodicyclohexylmethane. The mixture had a pot life of 48 hours. The mixture was applied to a glass plate in a layer 0.2 mm thick and cured by heating at 120° C. for 20 minutes. A clear, highly elastic polymer film having the following properties was obtained:

Elongation at break: 490%

100% modulus of elasticity: 4.9 N/mm$^2$

Tear strength: 13.9 N/mm$^2$

Example 4

3000 g of a polyether polyol, which had an OH number of 48 and was prepared by the propoxylation of trimethylolpropane, were heated at 70° C. for 5 hours, with stirring, together with 1400 g of 2,4-diisocyanato-toluene. Then the excess diisocyanate was removed by thin layer vacuum distillation at 140° C./0.2 mbar. A resulting NCO prepolymer had an NCO content of 3.2%.

800 g of a commercially available hydrocarbon resin having a hydroxyl group content of 2.25% (Novares LA 700, commercial product from VFT AG, Duisburg) and 0.2 g of tin(II) octoate were added to 1310 g of this prepolymer. The mixture was stirred for 10 hours at 60° C. At this time, free isocyanate could no longer be detected in the IR spectrum. The resulting blocked NCO prepolymer had the following properties:

Blocked NCO content: 2.0%

Viscosity (23° C.): 76,000 mPa.s 210 g of the prepolymer were intimately stirred together with 8.5 g of isophorone diamine. The mixture was poured out into a layer 3 mm thick and cured by heating at 120° C. for 20 minutes. A clear, elastic plastic material having the following mechanical properties was obtained:

Shore A hardness: 32

Elongation at break: 630%

Tear strength: 2.1 N/mm$^2$

Tear propagation resistance: 5.0 N/mm

Example 5

75 g of the prepolymer from example 2 were mixed with 25 g of an epoxide resin (Epikote 828, commercial product from Shell, epoxide equivalent weight 190) and 8.5 g of isophorone diamine. The mixture hardened overnight at room temperature. A slightly opaque, tough and resilient plastic material was obtained, which had a Shore A hardness of 84 and a Shore D hardness of 27.

Example 6

50 g of the prepolymer from example 2 were mixed with 50 g of an epoxide resin (Epikote 828, commercial product from Shell, epoxide equivalent weight 190) and 13 g of isophorone diamine. The mixture hardened overnight at room temperature. An opaque, impact resistant plastic material was obtained, which had a Shore D hardness of 72.

Example 7

25 g of the prepolymer from example 2 were mixed with 75 g of an epoxide resin (Epikote 828, commercial product from Shell, epoxide equivalent weight 190) and 55 g of isophorone diamine. The mixture hardened within 5 hours at room temperature. An opaque, brittle plastic material was obtained, which had a Shore D hardness of 80.

Example 8

50 g of the prepolymer from example 2 were mixed with 3.2 g of a commercially available polyamine adduct hardener, which was based on isophorone diamine/epoxide resin and had an amine number of 6.5 eq./kg (Hardener HY 847, commercial product from Ciba Specialty Chemicals). The mixture was cured by heating at 60° C. for 6 hours. A transparent, highly elastic plastic material was obtained, which had a Shore A hardness of 20.

Example 9

1330 g of the polyether polyol from example 1 were reacted for 20 hours at 100° C. with 222 g of isophorone diisocyanate until the theoretical NCO content of 2.8% was obtained. Then 940 g of the commercially available hydrocarbon resin from example 2 were added and the mixture was catalyzed with 0.4 g of tin(II) octoate and stirred for 10 hours at 80° C. At this time, free isocyanate could no longer be detected in the IR spectrum. The resulting blocked NCO prepolymer had the following properties:

Blocked NCO content: 1.7%

Viscosity (23° C.): 55,000 mPa.s 247 g of the blocked NCO prepolymer were intimately stirred together with 11.9 g of 3,3'-dimethyl-4,4'-diaminodicyclohexylmethane. The mixture was poured out into a layer 3 mm thick and cured by heating at 120° C. for 90 minutes. A transparent, highly elastic plastic material having the following mechanical properties was obtained.

Shore A hardness: 22
Elongation at break: 450%
Tear strength: 4.1 N/mm$^2$
Tear propagation resistance: 14 N/mm Example 10

425 g of the polyester diol from example 3, 500 g of the polyether diol from example 3 and 4.5 g of trimethylolpropane were reacted at 100° C. with 222 g of isophorone diisocyanate until the theoretical NCO content of 3.3% was obtained. Then 940 g of the commercially available hydrocarbon resin from example 2 were added and the mixture was catalyzed with 0.4 g of tin(II) octoate and stirred for 10 hours at 80° C. At this time, free isocyanate could no longer be detected in the IR spectrum. The resulting blocked NCO prepolymer was dissolved in methoxypropyl acetate to form a 95% solution, which had the following properties:

Blocked NCO content: 1.7%
Viscosity (23° C.): 35,000 mPa.s 247 g of the prepolymer were intimately stirred together with 10.5 g of 4,4'-diaminodicyclohexylmethane. The mixture was poured out into a layer 3 mm thick and cured by heating at 120° C. for 90 minutes. A transparent, highly elastic plastic material having a Shore A hardness of 18 was obtained.

Example 11—Comparison in Accordance with DE-A 2,152,606

245 g of a nonylphenol isomer mixture were added to 1504 g of the NCO prepolymer from example 1. After catalysis with 0.2 g of tin(II) octoate, the mixture was stirred for a further 10 hours at 60° C. At this time, free isocyanate could no longer be detected in the IR spectrum. The resulting blocked NCO prepolymer had the following properties:

Blocked NCO content: 2.4%
Viscosity: 98,000 mPa.s (23° C.)

175 g of the prepolymer were intimately stirred together with 11.9 g of 3,3'-dimethyl-4,4'-diaminodicyclohexylmethane. The mixture had a pot life of only 6 hours. After complete curing, a clear, elastic plastic material having the following mechanical properties was obtained:

Shore A hardness: 59
Elongation at break: 260%
Tear strength: 3.9 N/mm$^2$
Tear propagation resistance: 11 N/mm Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reactive composition comprising
   A) an organic polyisocyanate having a number average molecular weight (excluding the blocking agent) of 168 to 25,000, wherein the isocyanate groups are reversibly blocked with a hydrocarbon resin containing phenolic OH groups,
   B) an organic polyamine having at least two primary amino groups and
   C) optionally a compound containing oxirane groups.

2. The reactive composition of claim 1, wherein component A) comprises a blocked NCO prepolymer based on the reaction product of (i) an aromatic polyisocyanate having a molecular weight of 174 to 300 and (ii) a polyhydroxyl compound containing ether and/or ester groups and having a molecular weight of 1000 to 8000, wherein the isocyanate groups are reversibly blocked by reaction with a hydrocarbon resin containing phenolic OH groups.

3. The reactive composition of claim 1 wherein said hydrocarbon resin is liquid at room temperature and has a hydroxyl group content of 1.5 to 4.0% by weight, based on the weight of the hydrocarbon resin.

4. The reactive composition of claim 2 wherein said hydrocarbon resin is liquid at room temperature and has a hydroxyl group content of 1.5 to 4.0% by weight, based on the weight of the hydrocarbon resin.

5. The reactive composition of claim 1 wherein component B) comprises a diamine containing at least one cycloaliphatic ring and having a maximum molecular weight of 500.

6. The reactive composition of claim 2 wherein component B) comprises a diamine containing at least one cycloaliphatic ring and having a maximum molecular weight of 500.

7. The reactive composition of claim 3 wherein component B) comprises a diamine containing at least one cycloaliphatic ring and having a maximum molecular weight of 500.

8. The reactive composition of claim 4 wherein component B) comprises a diamine containing at least one cycloaliphatic ring and having a maximum molecular weight of 500.

9. The reactive composition of claim 1 wherein component C) is present and comprises a liquid epoxide resin, which is based on the reaction product of epichlorohydrin and diphenylolpropane-2,2 (bisphenol A) and has a molecular weight of 340 to 450.

10. The reactive composition of claim 2 wherein component C) is present and comprises a liquid epoxide resin, which is based on the reaction product of epichlorohydrin and diphenylolpropane-2,2 (bisphenol A) and has a molecular weight of 340 to 450.

11. The reactive composition of claim 3 wherein component C) is present and comprises a liquid epoxide resin, which is based on the reaction product of epichlorohydrin and diphenylolpropane-2,2 (bisphenol A) and has a molecular weight of 340 to 450.

12. The reactive composition of claim 4 wherein component C) is present and comprises a liquid epoxide resin, which is based on the reaction product of epichlorohydrin and diphenylolpropane-2,2 (bisphenol A) and has a molecular weight of 340 to 450.

13. The reactive composition of claim 5 wherein component C) is present and comprises a liquid epoxide resin, which is based on the reaction product of epichlorohydrin and diphenylolpropane-2,2 (bisphenol A) and has a molecular weight of 340 to 450.

14. The reactive composition of claim 6 wherein component C) is present and comprises a liquid epoxide resin, which is based on the reaction product of epichlorohydrin and diphenylolpropane-2,2 (bisphenol A) and has a molecular weight of 340 to 450.

15. The reactive composition of claim 7 wherein component C) is present and comprises a liquid epoxide resin, which is based on the reaction product of epichlorohydrin and diphenylolpropane-2,2 (bisphenol A) and has a molecular weight of 340 to 450.

16. The reactive composition of claim 8 wherein component C) is present and comprises a liquid epoxide resin, which is based on the reaction product of epichlorohydrin and diphenylolpropane-2,2 (bisphenol A) and has a molecular weight of 340 to 450.

17. A coating, adhesive, sealant, embedded compound or molded article prepared with the reactive composition of claim 1.

* * * * *